E. NUNAN.
Endless-Chain Saw.
No. 226,774. Patented April 20, 1880.
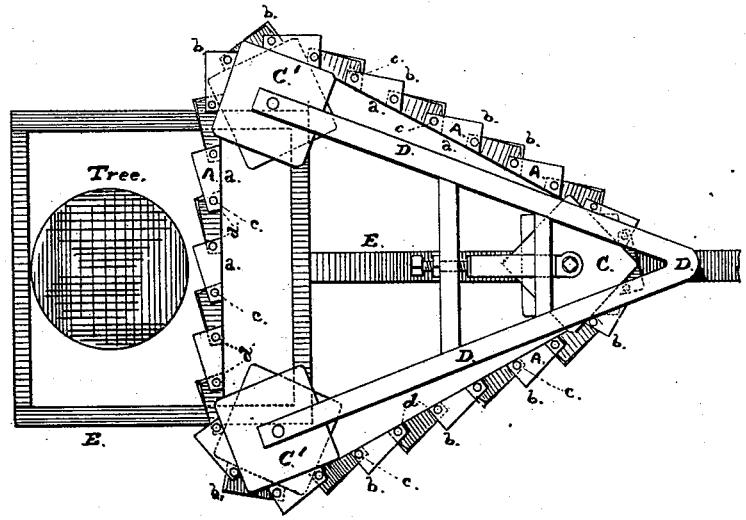
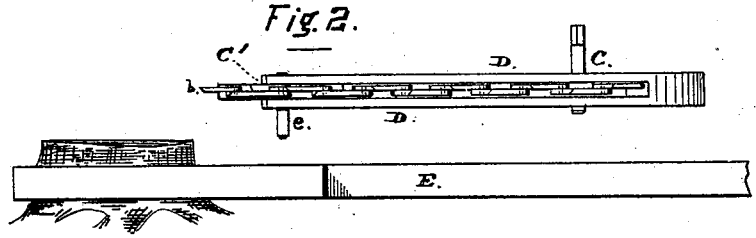
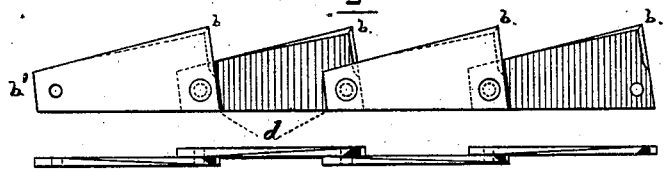
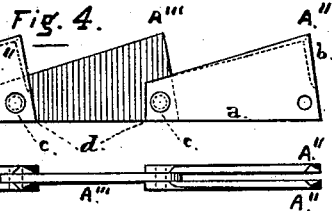
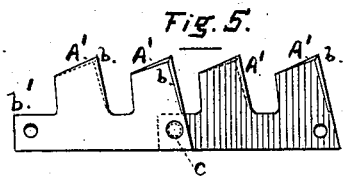
Witnesses: Edward Osborn, C. McClain
Inventor: Edward Nunan
By C. W. M. Smith
his Atty.

UNITED STATES PATENT OFFICE.

EDWARD NUNAN, OF SAN FRANCISCO, CALIFORNIA.

ENDLESS-CHAIN SAW.

SPECIFICATION forming part of Letters Patent No. 226,774, dated April 20, 1880.

Application filed June 12, 1879.

*To all whom it may concern:*

Be it known that I, EDWARD NUNAN, of the city and county of San Francisco, in the State of California, have invented a certain new and useful Improvement or Invention in Saws for Felling and Cutting up Trees; and I do hereby declare that the following is a full, clear, and exact description of the same, reference being had to the accompanying drawings, and the letters of reference thereon, which form part of this specification.

My invention relates to an improved construction of endless saws and mode of operating them for the purpose, more particularly, of felling trees and cutting them up into logs; and it has for its object to construct a strong and inexpensive endless saw which shall have the capacity to work rapidly and efficiently.

It consists in an endless flexible or jointed band composed of segments or sections pivoted or hinged together and with their outer edges formed into cutting teeth or surfaces. This chain is combined and employed with a suitable supporting-frame carrying driving disks or pulleys with angular peripheries or bearing-surfaces to engage with the saw and propel it with a regular continuous motion. A means for feeding this frame forward as the cutting progresses is also employed.

Referring to the said drawings, Figure 1 is a plan view of my improved saw. Fig. 2 is an elevation. Fig. 3 is a detail view of the sections of which the endless chain or band is composed. Figs. 4 and 5 show the construction of sections with double teeth.

I make the segments A A with a straight back or bearing-surface, $a$, to engage with the flat portions of the surface of the driving disk or disks, and with a cutting-surface, $b$, on the outer edge, of an angular shape, to form the teeth of the saw. I join these sections together in sufficient number to form a saw of the required length, and connect the two end sections, so as to give an endless band or link, and I connect one section with the other by a short rivet or pin, $c$, which presents a smooth flush surface on both sides of the section, and is so applied that the sections shall move freely upon one another with these pins as pivots, in order to allow the endless band or chain to bend and turn around the supporting and driving disks.

I make the segments or sections to compose one tooth, as at A, or several teeth or cutting-edges, as at A′, and I join them by overlapping their ends alternately upon and beneath one another, as shown at the plan view, Fig. 1, so that between the back end of one section and the front or tooth end of the next one on the same side of the chain there shall be a space, $d$, into which the angular portions of the rotating disks are caused to fit. This alternate arrangement of the cutting-edges $b$ gives the required set to the teeth. This band or chain I place upon a supporting-frame of triangular form, with guiding and driving pulleys situated at the angles, around which the saw is placed and strained to the required tension. The pulley C is the driving-pulley, and it is mounted in an adjustable bearing controlled by a set-screw, to bring the saw to the proper tension. These pulleys C C′ C′ are composed of rectangular disks bolted together, so that the corner of one disk is interposed and projects between two corners of the other disk.

The straight portions $a$ of the sections are received upon the straight part or edges of each disk, while the angles or corners of the disk engage with the spaces $d$ in the endless chain that are left between the head of one section and the heel of the next one on the same side. By this construction the saw is driven with a regular motion, and no slipping can occur. This frame D is mounted upon a bed, track, or platform in such manner that the portion of the endless chain or band supported between the two pulleys C′ C′ at the base of the triangle can be presented to the tree to be felled, and can be fed or moved forward as the sawing progresses.

The bottom of the frame is provided with friction-rollers $e$, which bear upon and against the guiding rails or track on the platform E.

In the operation of my invention the guiding track or frame E is fastened to the tree or to the ground in position, and the saw-frame is placed thereon and the driving-pulley set in motion by power applied to its shaft. The saw-frame is fed forward as the sawing progresses, so that the saw is pressed in a proper degree against the wood.

In the cross-cutting of trees lying upon the ground the triangular frame is to be raised up and held in a vertical position.

The segments of the band or chain are readily produced from small pieces of metal, and waste pieces can be utilized for this purpose. They are of quadrilateral shape, with a broad cutting end, $b$, and a narrow heel, $b'$, of sufficient width only to leave enough metal around the rivet-hole. As thus constructed my invention provides a strong, simple, and cheap machine, readily made by any blacksmith, and easily operated by horse or other power.

I am aware that endless band or link saws have been made of alternately two links and one link, as shown in Fig. 4. This construction I do not claim.

Having thus fully described my invention, what I claim as new, and desire to secure by Letters Patent, is—

1. An endless-chain or flexible saw composed of sections each forming a single tooth, the alternate teeth cutting upon opposite sides of the kerf and united together by pivotal connections, as shown and described.

2. A chain or flexible saw, in combination with pulleys G, formed of two rectangles placed side by side diagonally to each other, and secured together so that each alternate tooth of the saw, when in operation, shall bear upon different sections of the pulley, substantially as shown and described.

In testimony that I claim the foregoing I have hereunto set my hand and seal this 28th day of May, 1879.

EDWARD NUNAN. [L. S.]

Witnesses:
  C. W. M. SMITH,
  E. McCLAIN.